UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

993,736.  Specification of Letters Patent.  Patented May 30, 1911.

No Drawing.  Application filed September 27, 1910. Serial No. 583,996.

*To all whom it may concern:*

Be it known that I, PAUL THOMASCHEWSKI, doctor of philosophy, chemist, citizen of the German Empire, residing at Vohwinkel, near Elberfeld, Germany, have invented new and useful Improvements in Vat Dye, of which the following is a specification.

The present invention concerns the manufacture and production of new vat dyes which can be obtained by condensing polyhalogenated diarylcompounds, especially dichlorodiphenyls, dichloro-dimethyldiphenyls, with at least two molecules of an aminoanthraquinone.

The new dyes having probably the following general formula:

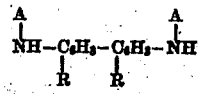

in which A means an anthraquinone substance and R an atom of hydrogen which may be substituted by alkyl groups are after being dried and pulverized dark powders soluble in pyridin with from a bluish-red to blue to violet color; soluble in concentrated sulfuric acid generally with a yellowish to brown to olive color; yielding vats with hydrosulfite and caustic soda lye, dyeing cotton from red to violet to blue to green fast shades.

In order to illustrate the new process more fully the following example is given, the parts being by weight:—A mixture of 2 parts of para-para¹-dichlorodiphenyl, 5 parts of 1-aminoanthraquinone, 5 parts of anhydrous sodium acetate, 0.5 parts of CuCl₂ and 40 parts of naphthalene is heated to boiling during 10 hours until the quantity of the dye does no longer increase. Alcohol is added, the new dye is filtered off from the liquid and washed with alcohol and then with hot water. It is a brown crystalline powder soluble in boiling pyridin with a bluish-red color, soluble in concentrated sulfuric acid with a yellow color. Upon treatment with hydrosulfite and caustic soda lye an orange-brown vat is obtained which dyes cotton fast violet.

The dye obtained from 4.4′-dibromodiphenyl and 1-monobenzoyl-4-aminoanthraquinone dyes bluish-green, that obtained from 4.4′-dichloro-3.3′-dimethyldiphenyl+1-amino-2-methyl-anthraquinone dyes violet, that obtained from 3.3′-dichlorodiphenyl+monobenzoyl-1.4-diaminoanthraquinone dyes blue.

I claim:—

1. The herein described new vat dyestuffs obtainable by condensing a dihalogendiaryl compound with an amino-anthraquinone, having probably the following general formula:

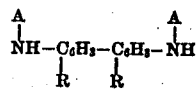

in which A means an anthraquinone substance and R an atom of hydrogen which may be substituted by alkyl groups which dyes are after being dried and pulverized dark powders soluble in pyridin with from a bluish-red to blue to violet color; being soluble in concentrated sulfuric acid generally with a yellow to brown to olive color; dyeing cotton from the vat from red to violet to blue to green shades, substantially as described.

2. The herein described new dye obtainable from para-para¹-dichlorodiphenyl and two molecules of 1-aminoanthraquinone having probably the following formula:

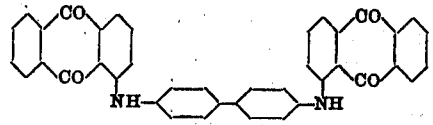

which is after being dried and pulverized a brown crystalline powder, soluble in boiling pyridin with a bluish-red color, soluble in concentrated sulfuric acid with a yellow color; dyeing cotton from a hydrosulfite vat fast violet shades, substantially as described.

In testimony whereof I have hereunto set my hand in the presence of two subscribing witnesses.

PAUL THOMASCHEWSKI. [L. S.]

Witnesses:
  CHAS. J. WRIGHT,
  WALTER VONNEGUT.